United States Patent [19]

Nagata et al.

[11] Patent Number: 4,962,947
[45] Date of Patent: Oct. 16, 1990

[54] IMPACT ENERGY ABSORBING STEERING WHEEL

[75] Inventors: Atsushi Nagata, Nagoya; Haruhiko Segawa, Aichi, both of Japan

[73] Assignee: Toyoda Gosei Co., Ltd., Nishikasugai, Japan

[21] Appl. No.: 271,308

[22] Filed: Nov. 15, 1988

[30] Foreign Application Priority Data

Dec. 25, 1987 [JP] Japan .................. 62-198112

[51] Int. Cl.$^5$ .................................................. B62D 1/04
[52] U.S. Cl. ................................... 280/777; 74/552
[58] Field of Search ................... 280/777, 780; 74/552

[56] References Cited

U.S. PATENT DOCUMENTS

| 3,930,420 | 1/1976 | Kizu et al. | 74/552 |
| 4,628,761 | 12/1986 | Niwa | 74/552 |
| 4,648,164 | 3/1987 | Hyodo et al. | 74/552 |
| 4,709,944 | 12/1987 | Hongo et al. | 280/777 |

FOREIGN PATENT DOCUMENTS

| 0027294 | 4/1981 | European Pat. Off. | 74/553 |
| 53-13730 | 7/1978 | Japan | 74/552 |
| 58-152660 | 10/1983 | Japan | 74/552 |
| 0014573 | 1/1984 | Japan | 74/552 |
| 60-9764 | 1/1985 | Japan | 74/552 |
| 0046762 | 2/1987 | Japan | 74/552 |

*Primary Examiner*—David M. Mitchell
*Attorney, Agent, or Firm*—Cushman, Darby & Cushman

[57] ABSTRACT

An impact energy steering wheel comprising a ring portion, at least one plastically deformable spoke core member, a boss portion, and a plastically deformable support member supporting an impact energy absorber and a pad. The support member is fixed to each of the spoke core members such that the support member, the energy absorber, and the pad are positioned so as to be spaced apart from and between the ring and the boss portions. When a generally horizontally acting impact force acts on the ring portion, the spoke core members are subjected to plastic deformation and the ring portion reorients so as to have an imaginary frontal plane extending in the vertical direction. The support member, being attached to each of the spoke core members, is affected by the deformation of these spoke core members and reorients so as to cause the impact energy absorber and the pad to have upper surfaces which extend in the vertical direction parallel to the ring portion imaginary frontal plane.

13 Claims, 7 Drawing Sheets

IMPACT ENERGY ABSORBING STEERING WHEEL

BACKGROUND OF THE INVENTION

1. Field of the Invention

The present invention relates to an impact energy absorbing steering wheel comprising a ring portion, a spoke portion, a boss portion, and a pad containing an impact energy absorber. The upper side of the boss portion, and the upper surface of the pad are spaced from, but generally parallel with, the ring portion, with the pad being disposed so as to be between the ring and boss portions. The spoke core is made of material capable of plastic deformation such that when an impact force acts on the ring portion, the spoke core deformations causing the ring portion to reorient in the vertical direction.

2. Description of the Prior Art

FIG. 1 depicts a currently known steering wheel 11 having an impact energy absorber 6. This energy absorber 6 is generally constructed of sheet metal, having a U-shaped cross section, and is positioned on the upper side of a boss portion B. This energy absorber 6 includes a pad 5 with an upper surface 5a positioned such that the upper surface 5a is spaced apart from but parallel to the surface of the ring portion R, an impact energy absorber 6 of sheet metal having a U-shaped cross-section is contained on upper side of a boss portion B, and a pad 5 with an upper surface 5a nearly in parallel to the surface of the A self aligning mechanism 3 having an annular plate 3a and a plurality of deformable arm portions 3b is interposed between a boss 2 and a core 4 of a spoke portion S, with a pad 5 including an impact energy absorber 6 being fixed to the plate 3a of the self aligning mechanism 3. Further, the spoke core 4 is formed by steel capable of plastic deformation (refer to Japanese patent application laid-open No. 58-152660, utility model application laid-open No. 60-9764).

In such a steering wheel 1, if a generally horizontal impact force F is applied to the ring portion R, the deformable arm portion 3b of the self aligning mechanism 3 is deformed, causing the upper surface 5a of the pad 5 and the ring portion R to reorient so as to extend vertically, perpendicular to the acting direction of the impact force F (refer to FIG. 2).

If additional horizontal impact force F is applied, the spoke core 4 is subjected to plastic deformation and the ring portion R approaches the boss 2, as the ring approaches the boss portion, the ring portion becomes substantially coincidental with the pad 5 also coincides substantially with the ring portion R and the impact energy absorber 6 is subjected to plastic deformation causing the energy to be absorbed (refer to FIG. 3).

In such a steering wheel 1, the energy imparted by the impact force F is absorbed during the deformation of not only the deformable arm portion 3b of the self aligning mechanism 3, but also the deformations of the spoke core 4 and the impact energy absorber 6.

SUMMARY OF THE INVENTION

In recent years, as shown in Japanese patent application laid-open No. 53-13730, in order to realize a light weight steering wheel which reduced manufacturing cost, die casting has been utilized to form the core of the steering wheel, the connection between a ring core and a spoke core, and the connection between a boss and a spoke core.

However, if the above-mentioned connections are made of die cast metal connectors, the following problems may be produced.

Installing one of the known self-aligning mechanisms 3 in such a steering wheel presents a problem because the mold structure of this part would by necessity be complicated, and would result in dramatically increased manufacturing costs. Consequently the self aligning mechanism 3 is omitted and the pad 5 and the impact energy absorber 6 are fixed directly to position of die casting metal. However, because the die casting metal is capable of only a small amount of plastic deformation when, the impact force F from the horizontal direction is applied to the ring portion R, and even if the surface of the ring portion reorients so as to extend vertically due to the plastic deformation of the spoke core 4, neither the upper surface 5a of the pad 5 nor the impact energy absorber 6 would likewise extend vertically in parallel to the surface of the ring portion.

If the impact energy absorber 6 contained in the pad 5 is capable of absorbing a predetermined amount of energy resulting from an impact force while oriented in the vertical direction, because the impact energy absorber 6 is not oriented to extend vertically, it cannot absorb the predetermined amount of energy.

An object of the present invention is to provide an impact energy absorbing steering wheel wherein even if the boss and the spoke core are connected utilizing a relatively inexpensive die cast metal connector, when the horizontal impact force acts on the ring portion, the upper surface of the pad containing the impact energy absorber can reorient so as to extend vertically, parallel with the surface of the ring portion.

The foregoing object can be obtained by an impact energy absorbing steering wheel comprising a boss portion, a steering ring portion disposed generally coaxially of the boss portion, but axially spaced apart, this steering ring having an imaginary frontal plane disposed to be presented towards an automobile driver, at least one generally radially extending spoke core member, each of the spoke core members having a radially inner end secured to the boss portion and a radially outer end being secured to the steering ring, each of the spoke members extend from the steering ring toward the boss portion, first at an angle of decline and then, from a point intermediate its two radial ends, towards the boss portion substantially in parallel relation with the steering ring imaginary plane, a support member disposed between the boss and ring portions and being substantially parallel to the steering ring imaginary frontal plane and securely fixed to a portion of each of the spoke core members extending from the steering ring toward the boss portion at an angle of decline, an impact energy absorber affixed to the support member, and a pad disposed between the boss and ring portions and having an upper surface extending substantially in parallel with the steering ring imaginary plane. Each of the spoke core and support members are constructed of materials capable of plastic deformation whereby when a generally horizontally acting impact force acts on the ring portion, the ring portion, support member, impact energy absorber and pad upper surface all reorient so as to extend vertically and oppose the generally horizontally acting impact force.

In the impact energy absorbing steering wheel according to the invention, when the impact force from the horizontal direction acts on the ring portion, the spoke core is subjected to plastic deformation and the surface of the ring portion reorients to extend in the vertical direction. Because the support member is fixed to the spoke core position, and because the support member and the pad supported by the support member are only slightly affected by the deformation of this core, the relative position of the support member and the pad in relation to the ring portion is maintained. Thereby the upper surface of the pad maintains a state in parallel to the surface of the ring portion before the deformation of the spoke core, and extends in the vertical direction in parallel with the ring surface.

Consequently, in the steering wheel according to the invention, if the boss and the spoke core are connected by casting of die casting metal capable of a relatively small amount of plastic deformation when the impact force from the horizontal direction acts on the ring portion, the upper surface of the pad is capable of extending in the vertical direction in parallel to the surface of the ring portion, whereby the impact force can act on the entire surface area of the impact energy absorber contained in the pad.

DESCRIPTION OF THE PREFERRED EMBODIMENTS

Preferred embodiments of the invention will now be described referring to the accompanying drawings.

Figure 1:
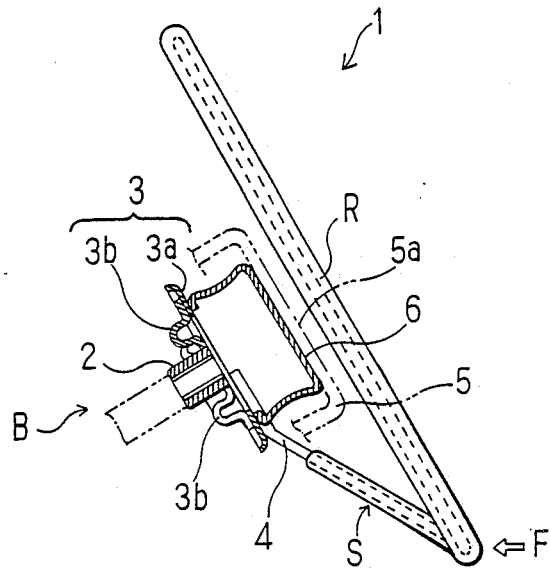
FIG. 1 is a sectional view of an impact energy absorbing steering wheel in the prior art.
Figure 2:
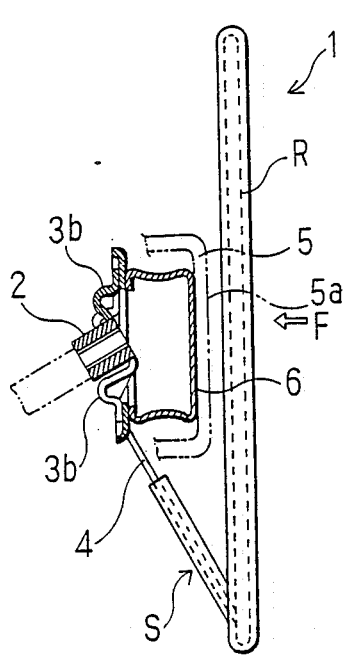
FIG. 2 is a sectional view illustrating mode when impact force acts on an impact energy absorbing steering wheel in the prior art.
Figure 3:
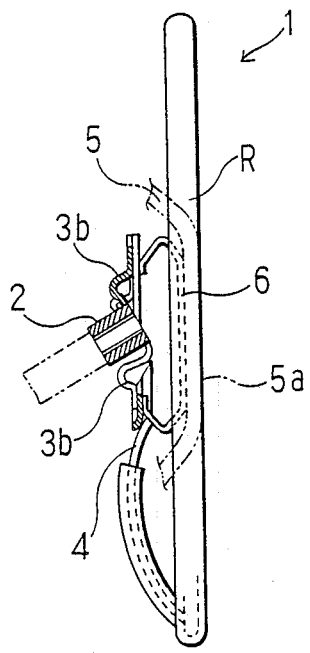
FIG. 3 is a sectional view illustrating mode when impact force further acts from the state shown in FIG. 2.
Figure 4:
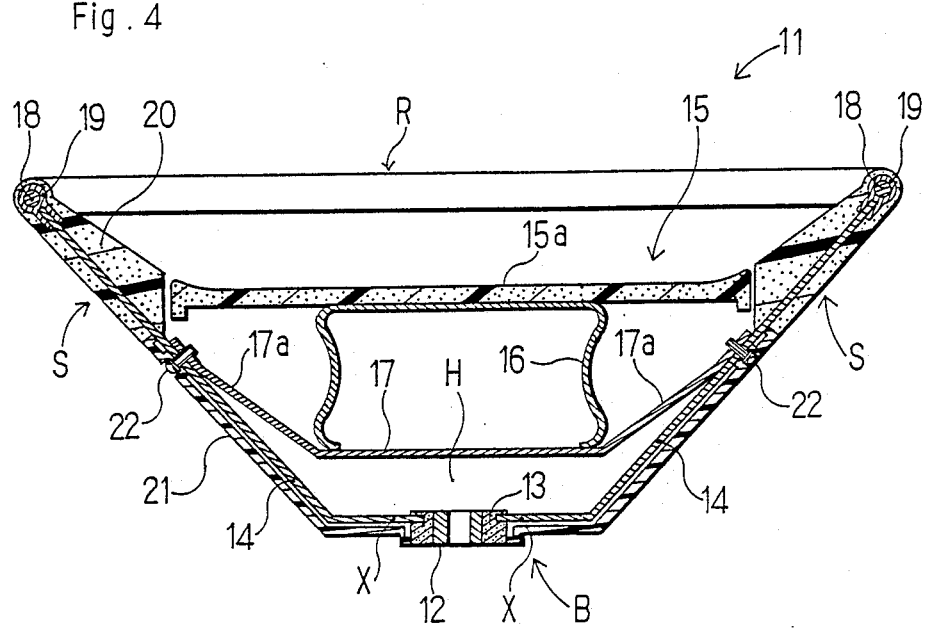
FIG. 4 is a sectional view of an impact energy absorbing steering wheel as an embodiment of the invention, and a partly omitted sectional view in position IV—IV of FIG. 5.
Figure 5:
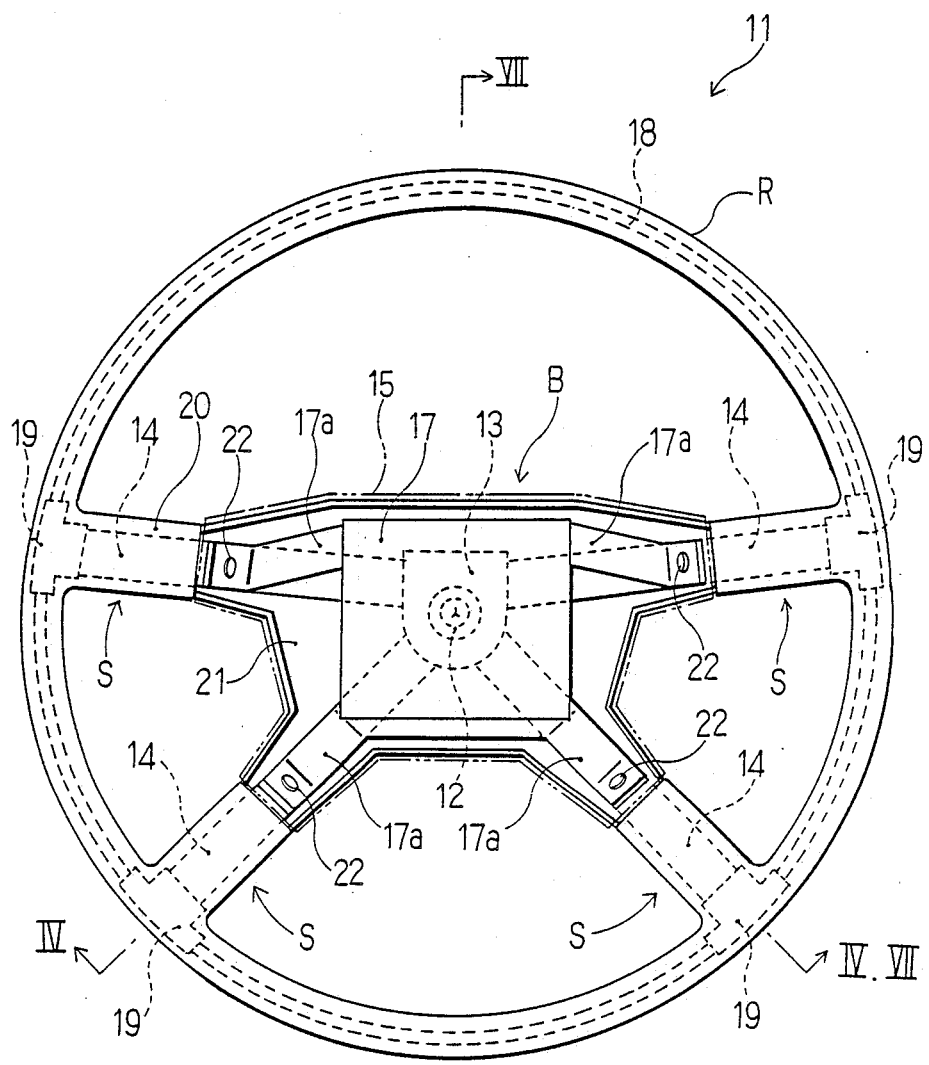
FIG. 5 is a plan view of the embodiment.

FIGS. 4 and 5 illustrate an embodiment of a steering wheel 11 having a boss portion B and a ring portion R connected by four spoke portions S. The connections between the boss 12 and the spoke core 14 as well as between the spoke core 14 and the ring core 18 are achieved by die cast connectors 13 and 19 respectively. These connectors may be cast of a light-alloy die casting metal such as aluminium, magnesium or the like.

Figure 11:
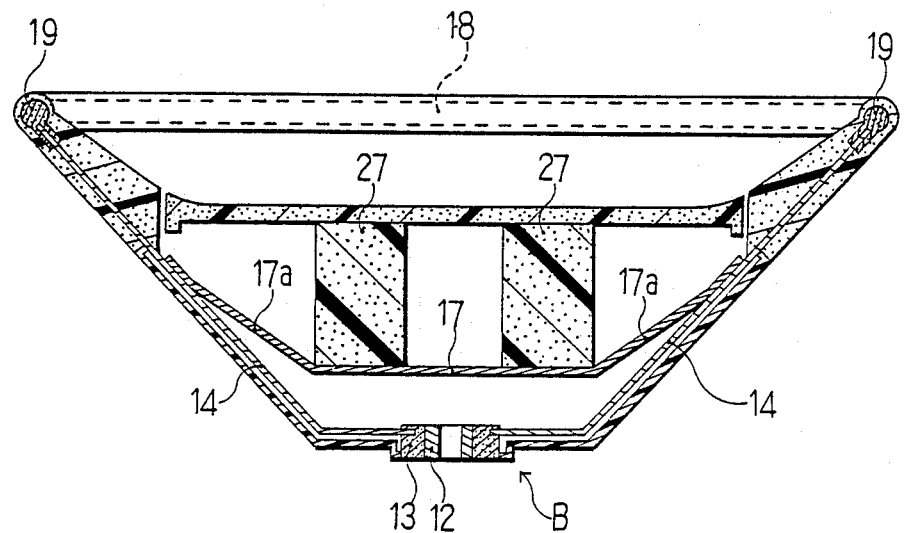
FIG. 11 is a sectional view of still another embodiment.

The boss 12, and the ring core 18 are generally constructed of steel, but may be formed by die casting a metal. For example, as shown in FIG. 11, the die cast connector 19 may also be extended so as to comprise ring core 18. Further, the spoke core 14 may be constructed of steel or an aluminium sheet formed by rolling or the like so long as the material utilized permits some degree of plastic deformation.

Also illustrated in FIG. 4 is a pad 15 having an upper surface 15a pad 15 is disposed so as to be spaced apart from but parallel to both the surface of the ring portion R and the upper side of the boss portion B intermediate position along each spoke portion S.

The pad 15 is provided on the inside with an impact energy absorber 16. This energy absorber 16 is comprised of a sheet metal having a U-shaped cross-section capable of absorbing a predetermined amount of impact energy from an impact force acting on the upper surface 15a of the pad 15. The impact energy absorber 16 is capable of plastic deformation through which it can absorb the predetermined amount of impact energy.

In the steering wheel 11 of the embodiment, the support member is fixed to the lower side of the impact energy absorber 16 by any known means including welding.

Figure 6:
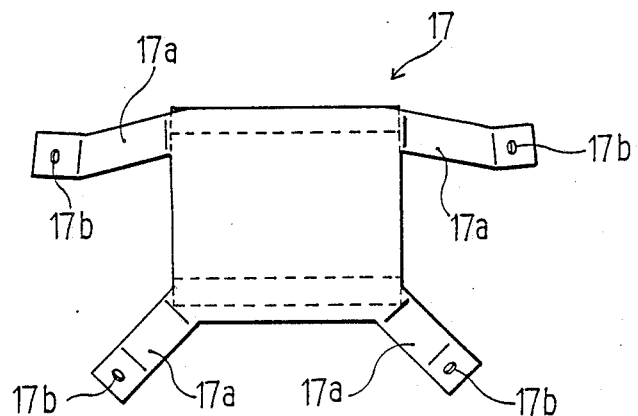
FIG. 6 is a bottom view of a support member used in the embodiment.

In the support member 17, as shown in FIG. 6, four legs 17a are formed on prescribed positions of the periphery. These legs 17a are capable of plastic deformation. The legs 17a are deformed with less impact energy than the the spoke core 14. Each leg 17a can be fastened to each spoke core 14 utilizing each of the tapped holes 17b by a screw 22, thereby the support member 17 is fixed to the steering wheel 11 and further the pad 15 containing the impact energy absorber 16 is fixed to the steering wheel 11. The position of each leg 17a fixed to the spoke core 14 is shifted from the position X near the die casting portion 13 at the state of plastic deformation of the spoke core 14 towards the ring portion R so that the ring portion R stands in the vertical direction at the initial condition of the impact force F from the horizontal direction acting on the ring portion R as hereinafter described.

In the embodiment, when the screw 22 is tightened, a lower cover 21 is also tightened together with the spoke core 14. The leg 17a of the support member 17 may also be fixed to the spoke core 14, by tightening screw 22 or by welding or the like as shown in FIG. 11.

Further in the support member 17 of the embodiment, when it is fixed to the spoke core 14, a distance H of about 20 mm is provided between the support member 17 and the boss 12 or the die cast portion 13. The distance H is provided so that the support member 17 does not interfere with the boss 12 or the die cast portion 13, when the impact force F acts on the ring portion R thereby allowing the ring portion R to reorient and extend in the vertical direction.

Next, mode when the steering wheel 11 of the embodiment is The effect of a generally horizontal impact force F acting on the ring portion R of the steering wheel 11 of the present invention is described below.

Figure 7:
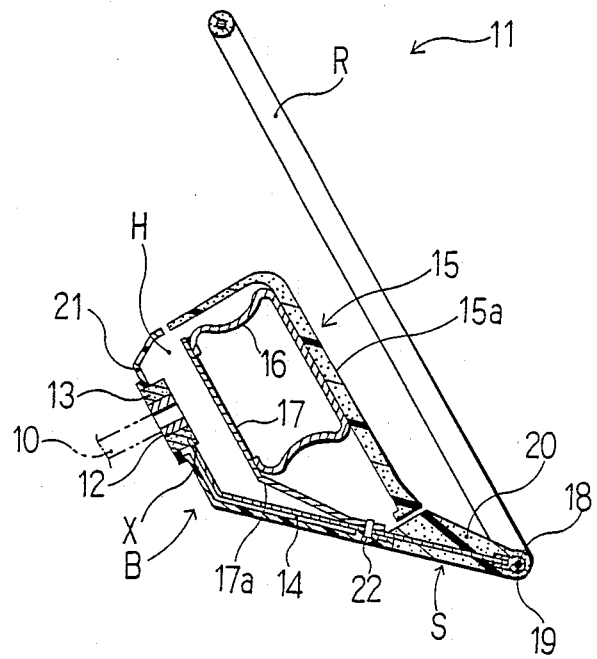
FIG. 7 is a partly omitted sectional view in position VII—VII of FIG. 5.
Figure 8:
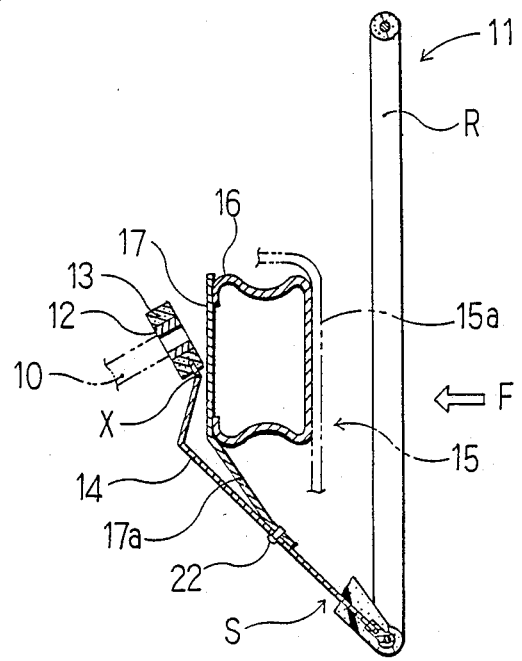
FIG. 8 is a sectional view illustrating mode when impact force acts on the impact energy abosrbing steering wheel of the embodiment.

In the state shown in FIG. 7, when the impact force F from the horizontal direction acts on the ring portion R, the spoke core 14 is subjected to plastic deformation at a predermined position X and the surface of the ring portion R reorients so as to extend in the vertical direction as shown in FIG. 8. In this case, because the impact energy absorber 16 contained in the pad 15 is fixed to the support member 17 at a point that has shifted as a result of the plastic deformation at position X, and because the pad 15 is slightly affected by the deformation of the spoke core 14, the impact energy absorber's position relative to the ring portion R is maintained and the upper surface 15a of the pad 15 extends in the vertical direction nearly in parallel to the surface of the ring portion R.

Figure 9:
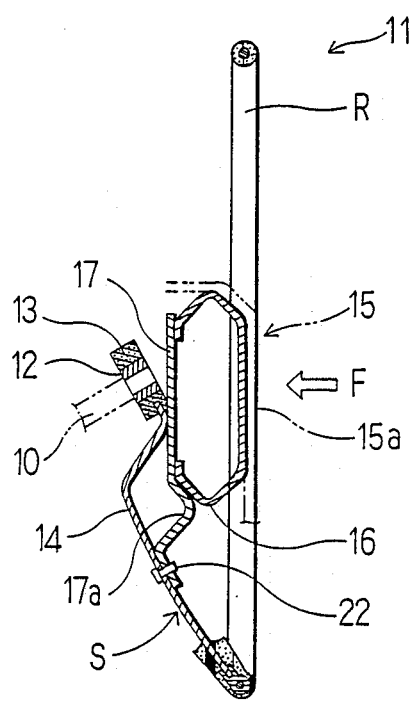
FIG. 9 is a sectional view illustrating mode when impact force further acts from the state shown in FIG. 8.

If the generally horizontal impact force F is further applied to the whole surface of the ring portion R, as shown in FIG. 9, the spoke core 14 is subjected to additional plastic deformation and the ring portion R approaches the boss portion 12 and the upper surface 15a of the pad 15 coincides with the ring portion R, and thereafter the impact force F acts on the now vertically oriented impact energy absorber 16 through the upper surface 15a of the pad 15 and the impact energy absorber 16 absorbs the predetermined amount of energy and is deformed, thereby the leg 17a is subjected to plastic deformation and the height of the pad 15 is decreased.

Consequently, in the steering wheel 11 of the embodiment, at the instant that the impact force F from the horizontal direction acts on the ring portion R, the upper surface 15a of the pad 15 reorients to extend in the vertical direction nearly in parallel with the surface of the ring portion R, and the impact force F thereafter acts on the newly reoriented impact energy absorber 16 contained in the pad 15.

Figure 10:
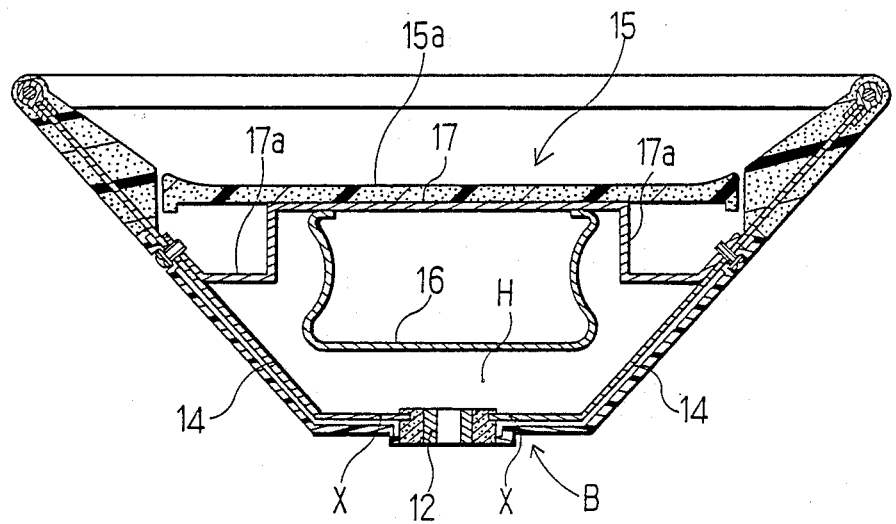
FIG. 10 is a sectional view of another embodiment.

In the embodiment, although the support member 17 is shown as supporting the energy absorber 16 in the pad 15 from the under-side as shown in FIG. 10, the support member 17 may also be supported from the upper side of the impact energy absorber 16.

Also in the embodiment, although the impact energy absorber 16 is made of sheet metal and subjected to plastic deformation, the impact energy absorber 27 may also be made of a brittle plastic material such as hard polyurethane foam as is shown in FIG. 11.

Figure 12:
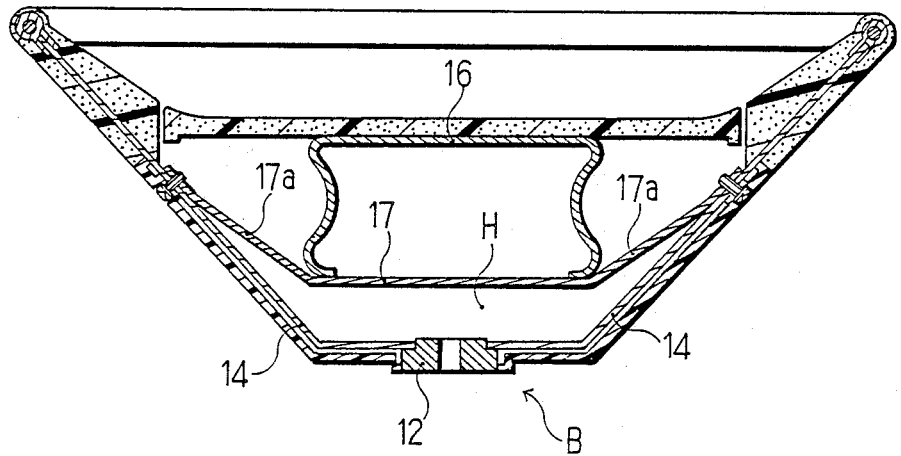
FIG. 12 is a sectional view of still another embodiment.
Figure 13:
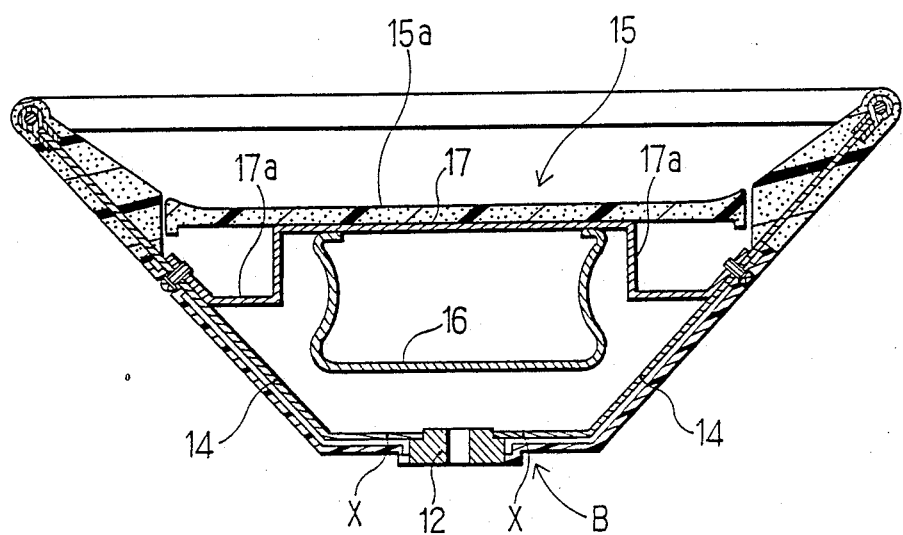
FIG. 13 is a sectional view of still another embodiment.

Further, as another embodiment, although the boss 12 and the spoke core 14 are connected by the die cast connector 13, as shown in FIG. 12, the invention may also be applied to a steering wheel in which where the boss 12 and the spoke core 14 are connected by welding. Also in this case, as shown in FIG. 13, the support member 17 may be fixed to upper side of the energy absorber 16.

What is claimed is:

1. An impact energy absorbing steering wheel comprising:
   a boss portion;
   a ring portion disposed generally coaxially of said boss portion, but axially and radially spaced apart, said ring portion having an imaginary frontal plane disposed to be presented towards an automobile driver;
   at least two generally radially extending spoke core members, each having a radially inner end secured to said boss portion and a radially outer end secured to said ring portion;
   each of said spoke core members having a slanting portion extending from said ring portion toward said boss portion at an acute angle to a point intermediate the two radial ends thereof, and a second portion connecting said intermediate point to said boss portion;
   a support member disposed between said boss and ring portions substantially parallel to said ring portion imaginary frontal plane and securely fixed to slanting portions of said spoke core members;
   an impact energy absorber having an upper surface and being affixed to said support member; and
   a pad disposed between said support member and said ring portion and having an upper surface extending substantially in parallel with said ring portion imaginary frontal plane;
   each of said spoke core and support members being constructed of materials capable of plastic deformation and said support member and impact energy absorber being spaced from said boss portion whereby when an impact force acts on said ring portion at a non-perpendicular angle relative to said frontal plane, said ring portion, said impact energy absorber upper surface and pad upper surface all re-orient so as to extend substantially perpendicular to said impact force without interference from said boss portion.

2. An impact energy steering wheel as set forth in claim 1, wherein a boss made of steel is arranged in said boss portion, and each of said spoke core members is connected to said boss by a die cast portion cast of light-alloy die casting metal.

3. An impact energy absorbing steering wheel as set forth in claim 2, wherein said support member is fixed to a lower side of said impact energy absorber, and a distance is provided between said support member and said boss or the die cast portion so that said support member does not interfere with said boss or said die cast portion, when said impact force acts on said ring portion and said ring portion reorients so as to extend perpendicularly to said force.

4. An impact absorbing steering wheel as set forth in claim 1, wherein said support member is formed of sheet metal having legs fixed to each of said spoke core members, and said legs are constructed of a plastically deformable material capable of being deformed more easily than the material comprising each of said spoke core members.

5. An impact energy absorbing steering wheel as set forth in claim 2, wherein said support member is fixed to an upper side of said impact energy absorber, and a predetermined distance is provided between said impact energy absorber and said boss or said die casting portion so that said impact energy absorber does not interfere with said boss or said die casting portion when an impact force from the horizontal direction acts on said ring portion and said ring portion stands in a vertical direction.

6. An impact energy absorbing steering wheel as set forth in claim 4, wherein said legs are fixed to said spoke core by locking screws.

7. An impact energy absorbing steering wheel as set forth in claim 4, wherein said legs are fixed to said spoke core by welding.

8. An impact energy absorbing steering wheel as set forth in claim 1, wherein said impact energy absorber is formed of sheet metal.

9. An impact energy absorbing steering wheel as set forth in claim 1, wherein said impact energy absorber is formed by a brittle plastic material such as hard polyurethane foam.

10. An impact energy absorbing steering wheel as set forth in claim 1, wherein a boss made of steel is arranged in said boss portion, and said spoke core is connected to said boss by welding.

11. An impact energy absorbing steering wheel as set forth in claim 10, wherein said support member is fixed to lower side of said impact energy absorber, and a distance is provided between said support member and said boss so that said support member does not interfere with said boss, when the impact force acts on said ring portion as aforesaid.

12. An impact energy absorbing steering wheel as set forth in claim 10, wherein said support member is fixed to upper side of said impact energy absorber, and a distance is provided between said impact energy absorber and said boss so that said impact energy absorber does not interfere with said boss, when the impact force acts on said ring portion as aforesaid.

13. An impact energy absorbing steering wheel as in claim 1, wherein said support member is fixed to each of said spoke core members by locking screws.

* * * * *